(12) United States Patent
Hahn et al.

(10) Patent No.: US 12,490,292 B2
(45) Date of Patent: Dec. 2, 2025

(54) METHOD AND DEVICE FOR RESOURCE IN SIDELINK COMMUNICATION

(71) Applicants: HYUNDAI MOTOR COMPANY, Seoul (KR); KIA CORPORATION, Seoul (KR); Wonkwang University Center For Industry-Academy Cooperation, Iksan-si (KR)

(72) Inventors: Gene Back Hahn, Hwaseong-si (KR); In Yong Jung, Hwaseong-si (KR); Hyuk Min Son, Iksan-si (KR)

(73) Assignees: Hyundai Motor Company, Seoul (KR); Kia Corporation, Seoul (KR); Wonkwang University Center for Industry-Academy Cooperation, Iksan-si (KR)

( * ) Notice: Subject to any disclaimer, the term of this patent is extended or adjusted under 35 U.S.C. 154(b) by 419 days.

(21) Appl. No.: 18/030,021

(22) PCT Filed: Oct. 6, 2021

(86) PCT No.: PCT/KR2021/013700
§ 371 (c)(1),
(2) Date: Apr. 3, 2023

(87) PCT Pub. No.: WO2022/080741
PCT Pub. Date: Apr. 21, 2022

(65) Prior Publication Data
US 2023/0379957 A1    Nov. 23, 2023

Related U.S. Application Data

(60) Provisional application No. 63/090,472, filed on Oct. 12, 2020.

(30) Foreign Application Priority Data

Sep. 29, 2021    (KR) .................. 10-2021-0129188

(51) Int. Cl.
*H04W 72/542* (2023.01)
*H04L 1/1812* (2023.01)
(Continued)

(52) U.S. Cl.
CPC ......... *H04W 72/542* (2023.01); *H04L 1/1812* (2013.01); *H04W 72/02* (2013.01); *H04W 72/563* (2023.01)

(58) Field of Classification Search
None
See application file for complete search history.

(56) References Cited

U.S. PATENT DOCUMENTS 11,765,689 B2    9/2023   Seo et al.
2021/0219368 A1*  7/2021   Fujishiro ............... H04W 76/27
(Continued)

FOREIGN PATENT DOCUMENTS

WO    2020/091348 A1    5/2020
WO    2020/126657 A1    6/2020
WO    2020/198317 A1    10/2020

OTHER PUBLICATIONS

International Search dated Jan. 13, 2022 issued in International Patent Application No. PCT/KR2021/013700.
(Continued)

*Primary Examiner* — Robert M Morlan
(74) *Attorney, Agent, or Firm* — Morgan Lewis & Bockius LLP

(57) ABSTRACT

Disclosed are a method and device for resource selection in sidelink communication. An operation method of a first transmission terminal comprises the steps of: checking the congestion level in one or more measurement areas; selecting a first resource selection area from among a plurality of resource selection areas when the congestion level is at least a first reference value; selecting a transmission resource
(Continued)

within the first resource selection area; and performing sidelink communication with a reception terminal by using the transmission resource.

20 Claims, 12 Drawing Sheets

(51) Int. Cl.
*H04W 72/02* (2009.01)
*H04W 72/563* (2023.01)

(56) References Cited

U.S. PATENT DOCUMENTS

2022/0095331 A1* 3/2022 Laselva ............... H04W 76/27
2022/0330079 A1* 10/2022 Zhu ...................... H04W 28/06

OTHER PUBLICATIONS

"Discussion on remaining MAC open issues for 5G V2X with NR SL," 3GPP TSG-RAN WG2 Meeting #109-bis electronic, Apr. 20-30, 2020 (R2-20xxxxx).
"Discussion on NR sidelink Mode 2 resource allocation," 3GPP TSG-RAN WG1 #98-bis, Oct. 14-20, 2019 (R1-1910007).
"Sidelink Resource Allocation Mechanism for NR V2X," 3GPP TSG-RAN WG1 #98, Aug. 26-30, 2019 (R1-1909254).
"Discussion on resource reservation, sensing and selectioninMode 2," 3GPP TSG-RAN WG1 Meeting #98, Aug. 26-30, 2019 (R1-1908366).
"OnResource Allocation Mechanism for NR V2X," 3GPP TSG-RAN WG1 #96, Feb. 25 through Mar. 1, 2019 (R1-1902276).

* cited by examiner

[FIG. 1]
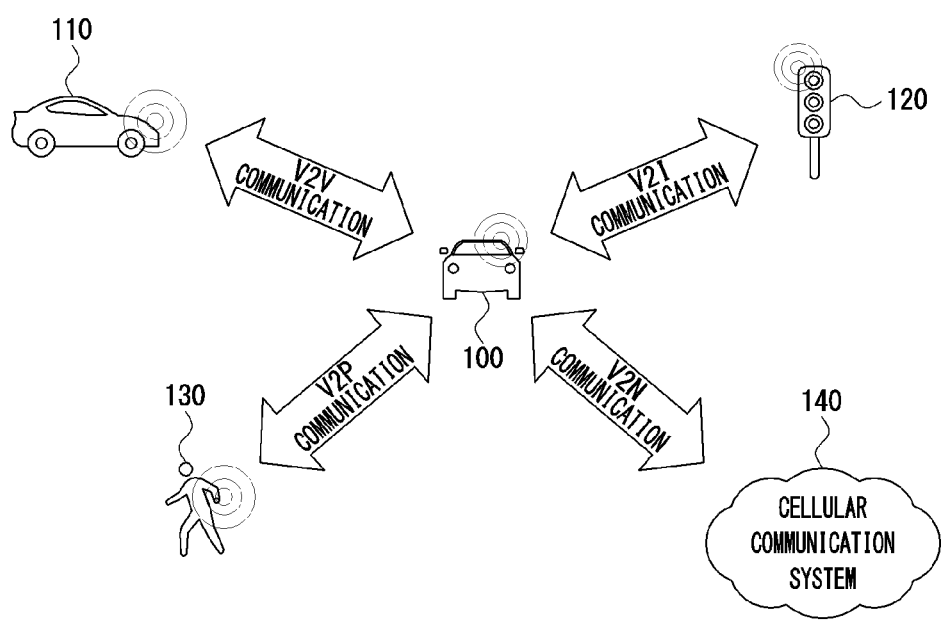

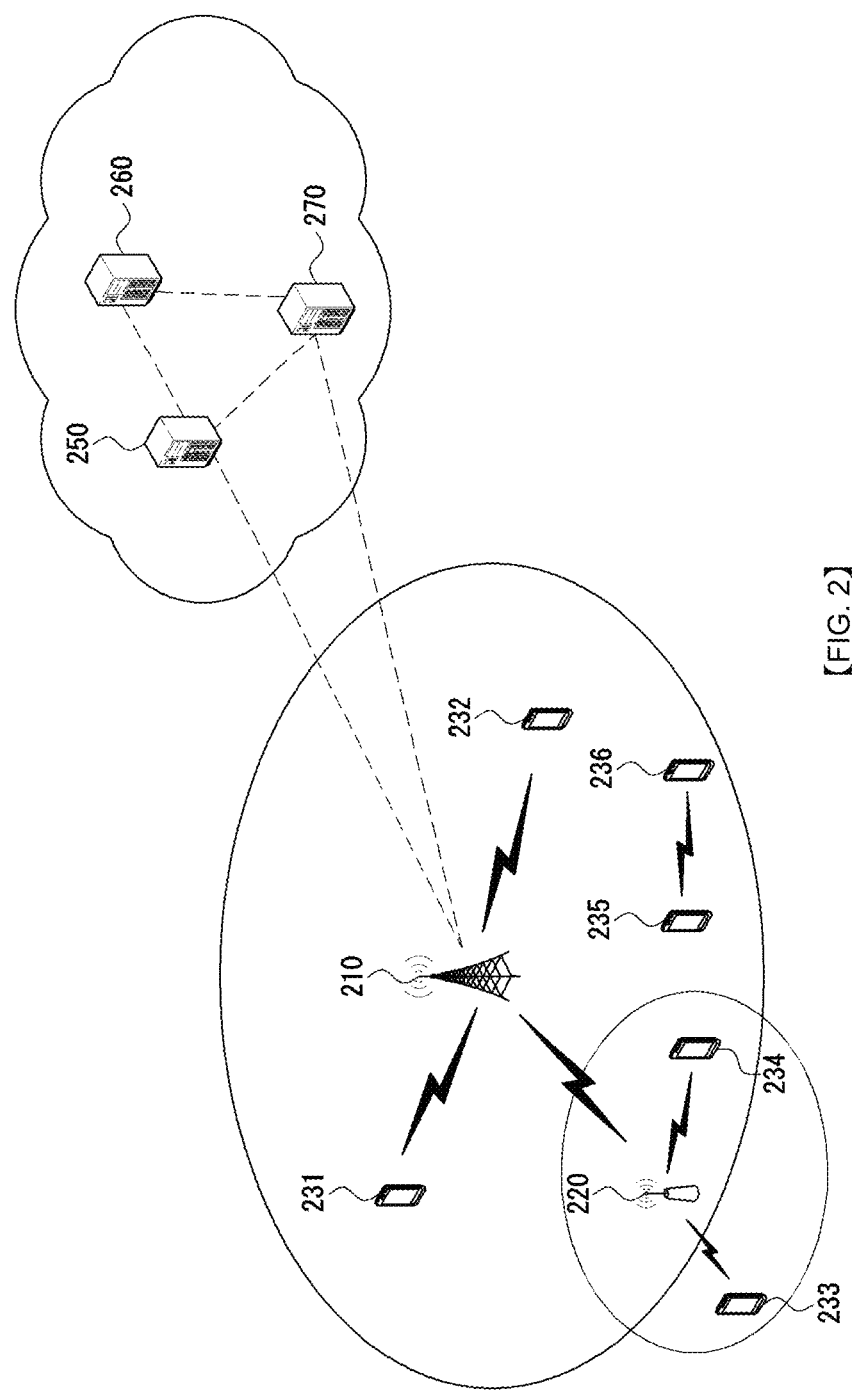
[FIG. 2]

[FIG. 3]
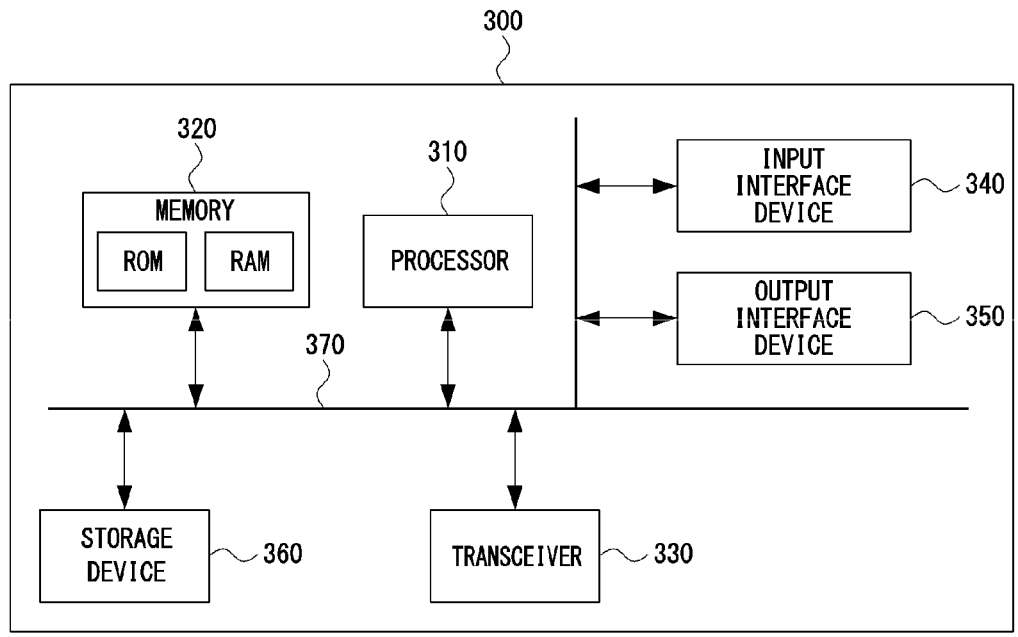
[FIG. 4]
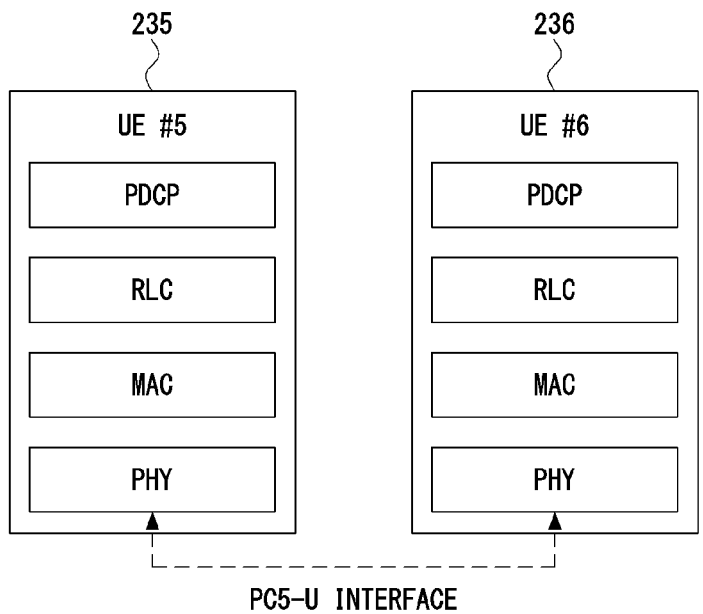

【FIG. 5】
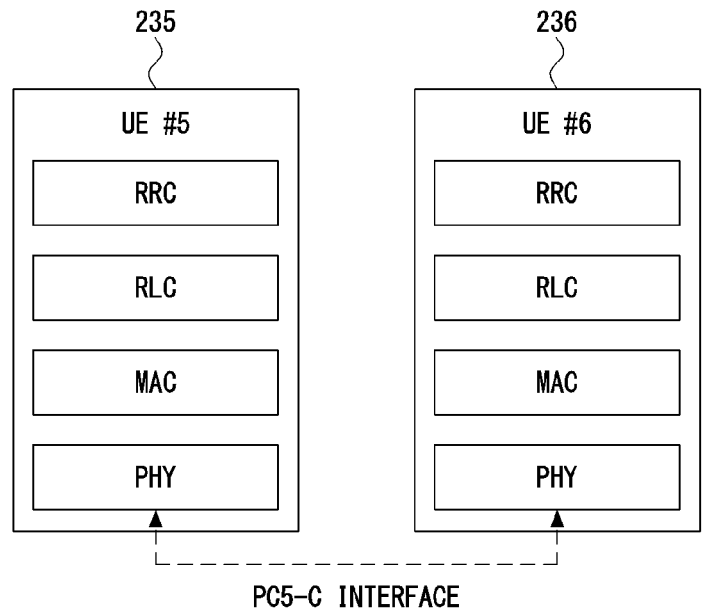
【FIG. 6】
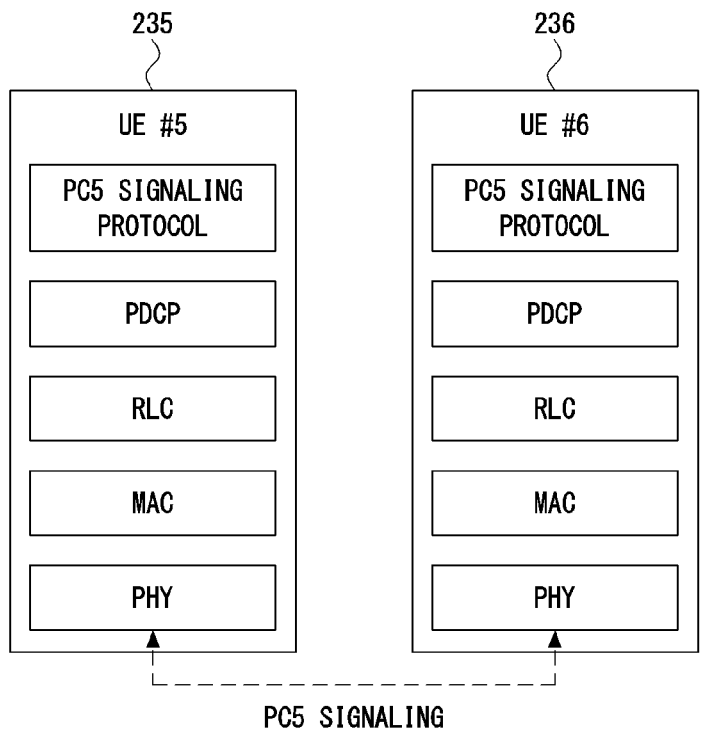

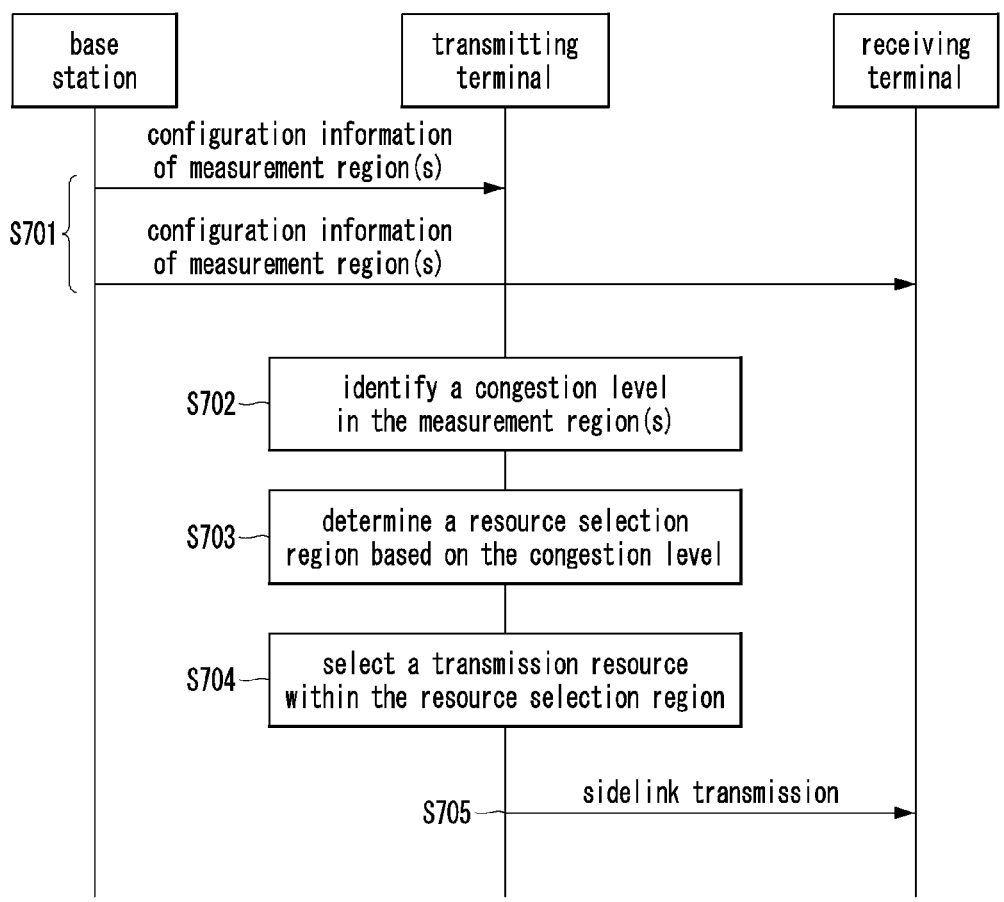

[FIG. 8]
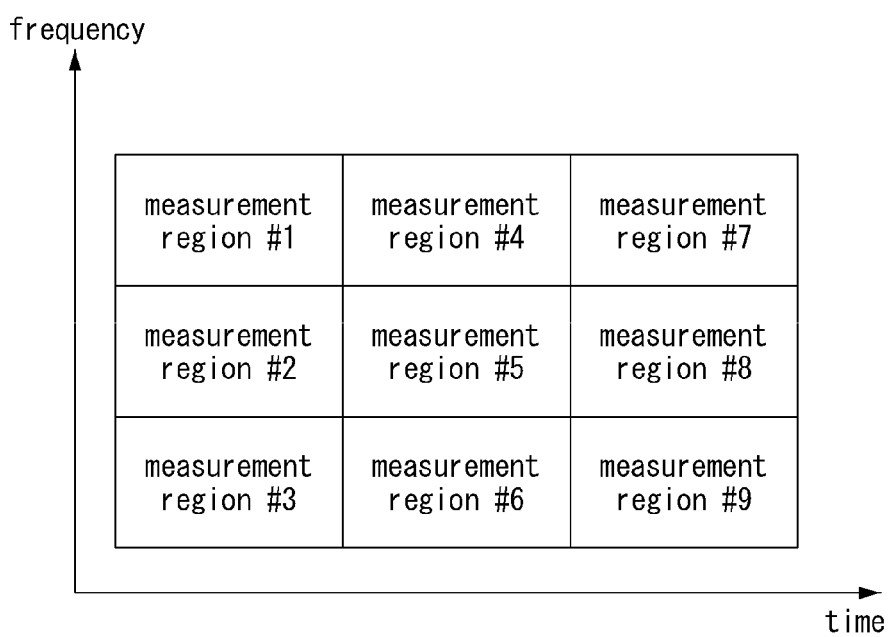

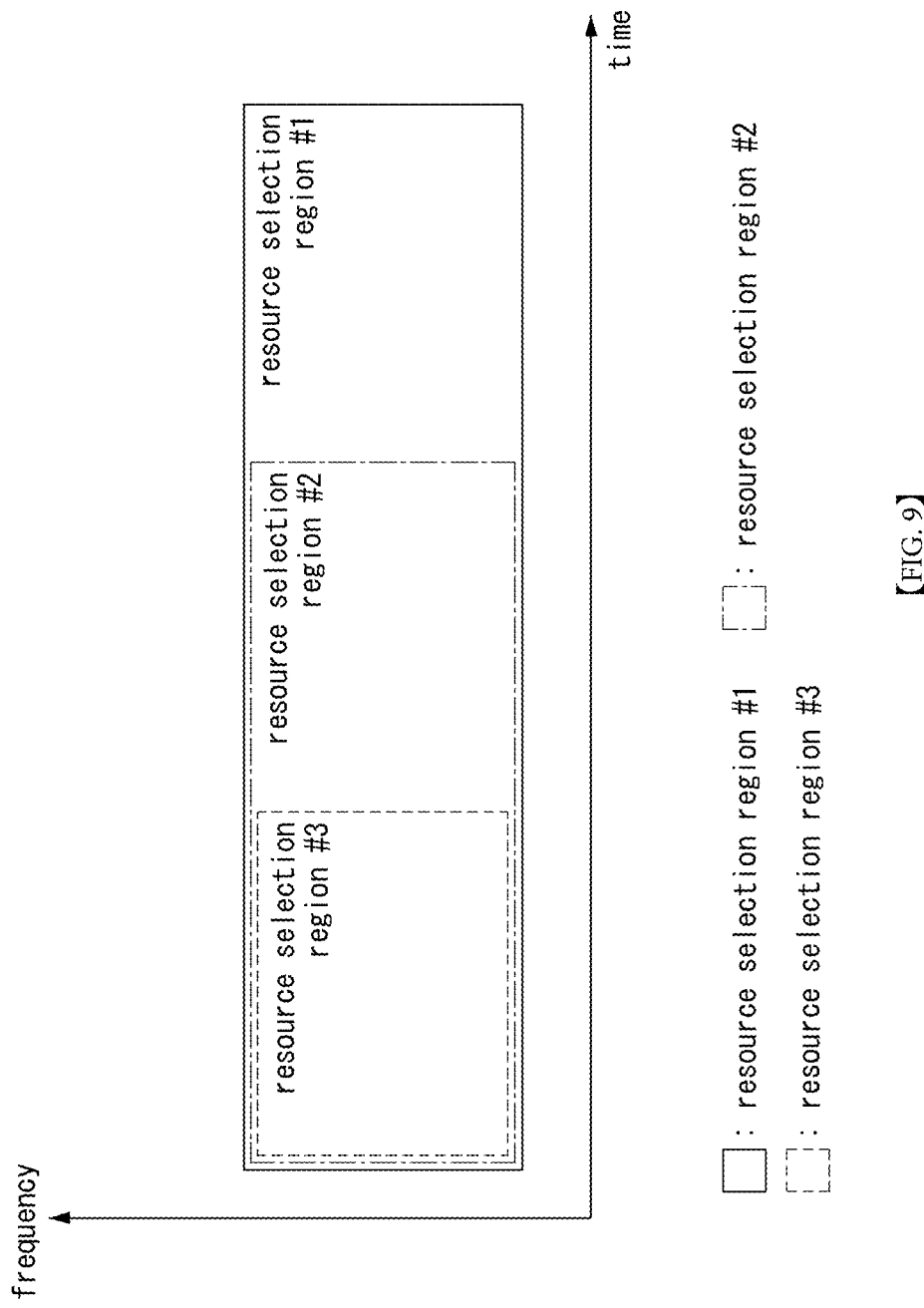
[FIG. 9]

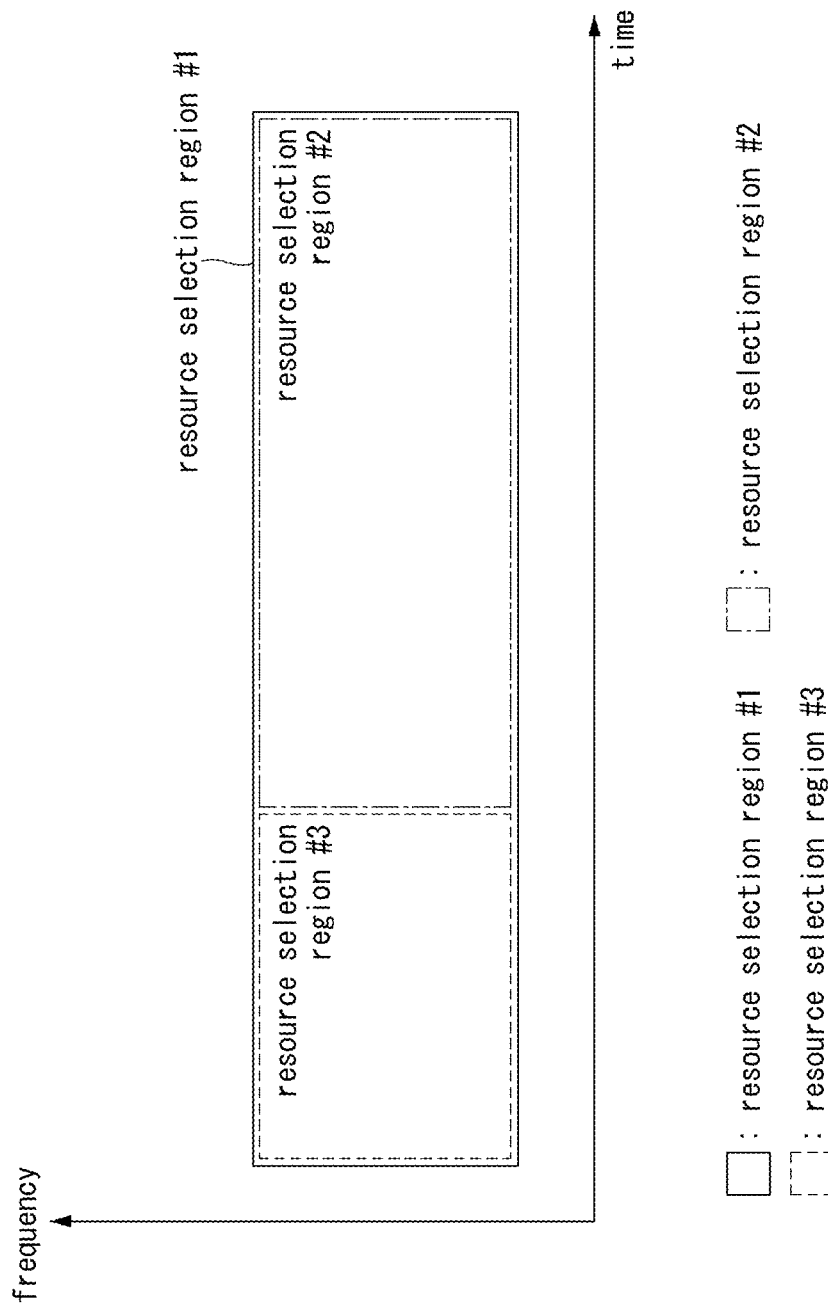
[FIG. 10]

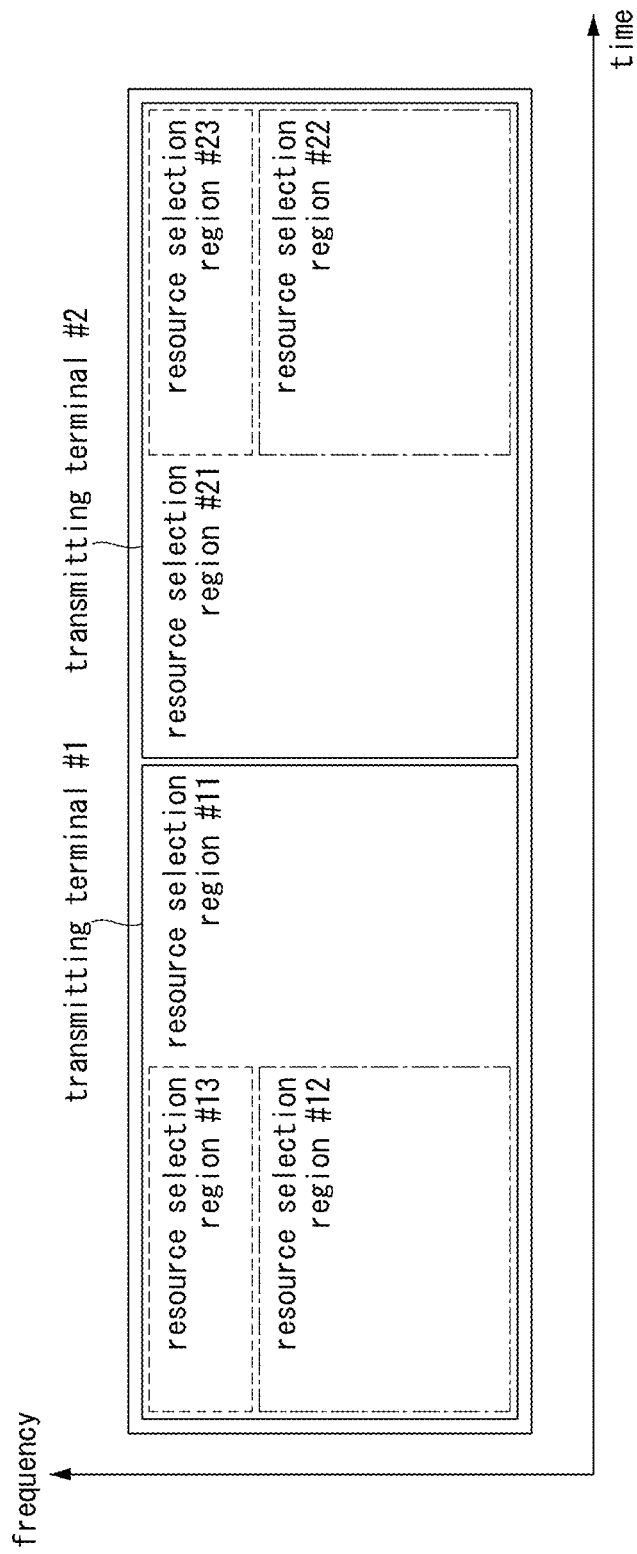
[FIG. 11]

[FIG. 12]
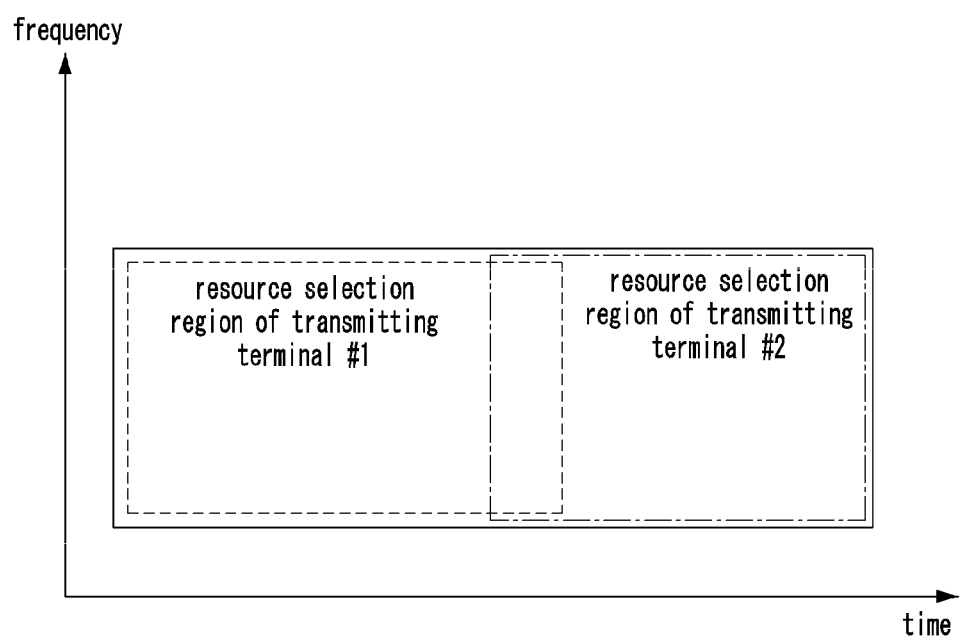

[FIG. 13]
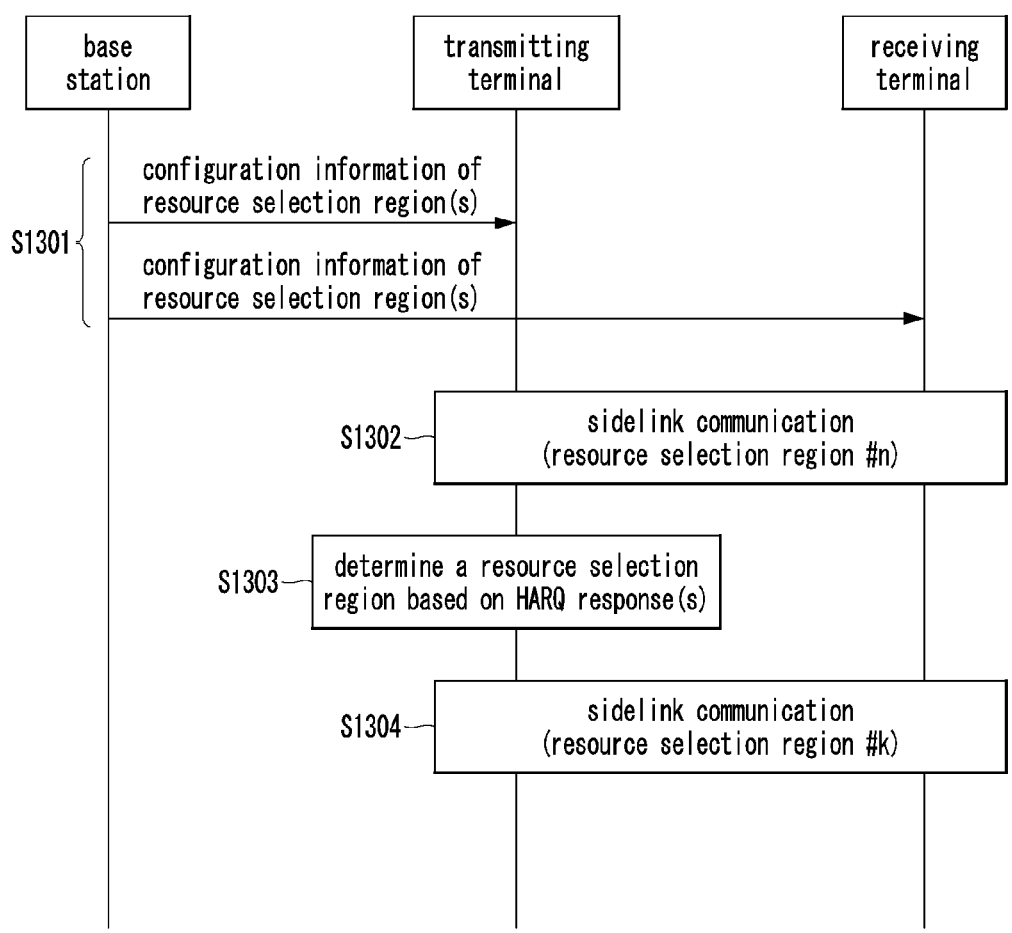

[FIG. 14]
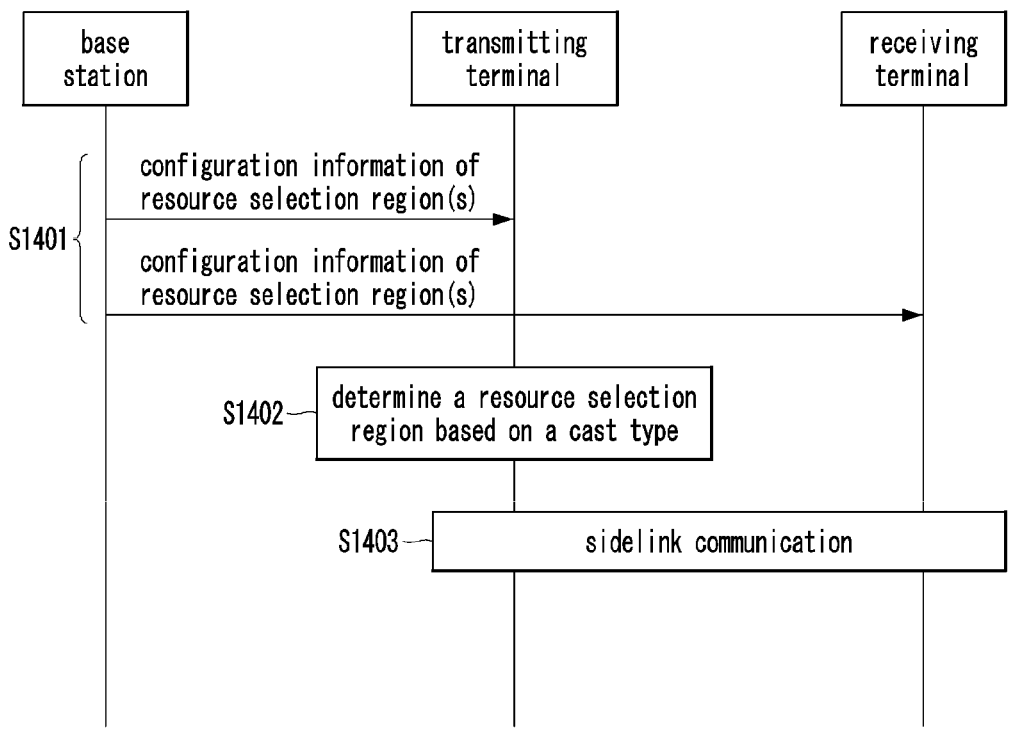
[FIG. 15]
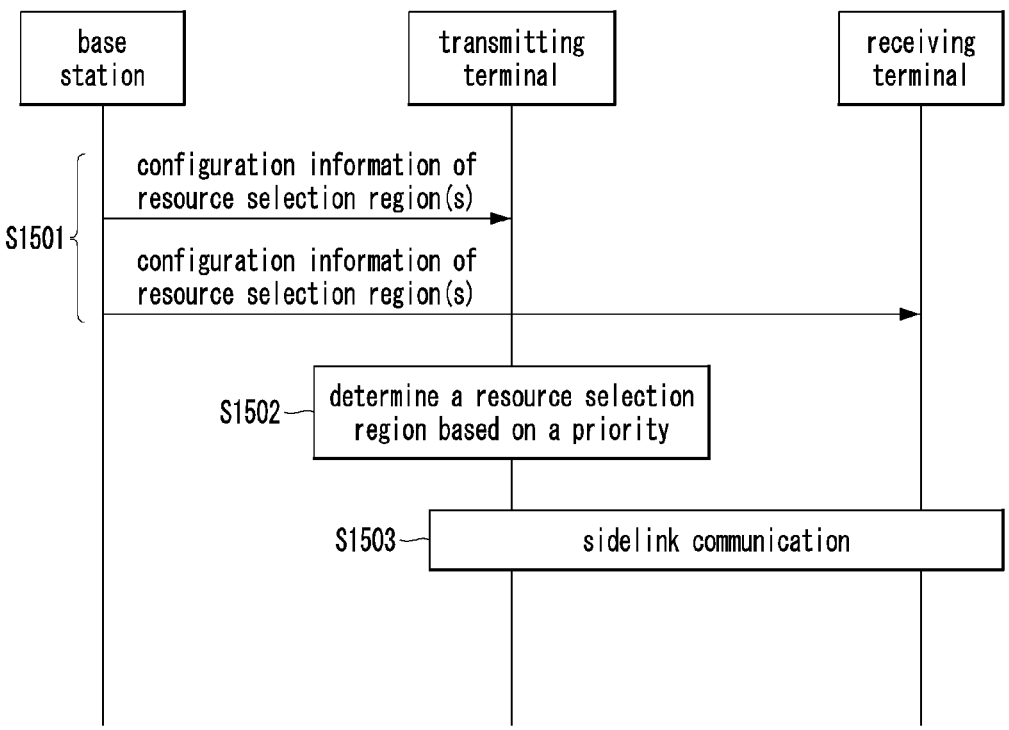

METHOD AND DEVICE FOR RESOURCE IN SIDELINK COMMUNICATION

CROSS-REFERENCE OF RELATED APPLICATIONS

This application is the U.S. National Phase under 35 U.S.C. § 371 of International Patent Application No. PCT/KR2021/013700, filed on Oct. 6, 2021, which claims priority to Korean Patent Application No. 10-2021-0129188, filed Sep. 29, 2021, and U.S. Provisional Patent Application Nos. 63/090,472, filed on Oct. 12, 2020, the disclosures of which are incorporated by reference herein in their entireties.

TECHNICAL FIELD

The present disclosure relates to a sidelink communication technique, and more particularly, to a technique for selecting resources to be used for sidelink communication.

BACKGROUND ART

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g., periodic sidelink data) may be transmitted using the CG resources.

Meanwhile, a terminal may select a sidelink resource by performing a partial sensing operation or a random selection operation, and may perform sidelink communication using the selected sidelink resource. As the number of times (or execution range) that the partial sensing operation or the random selection operation is performed increases, a collision probability in sidelink communication may decrease. That is, transmission performance of sidelink data can be improved. On the other hand, as the number of times (or execution range) that the partial sensing operation or the random selection operation is performed increases, power consumption in the terminal may increase. That is, a relationship between the collision probability and the power consumption may be a tradeoff relationship. In sidelink communication, methods for satisfying both reduction in collision probability and reduction in power consumption are required.

DISCLOSURE

Technical Problem

The present disclosure is directed to providing a method and an apparatus for selecting resources in sidelink communication.

Technical Solution

An operation method of a first transmitting terminal, according to a first exemplary embodiment of the present disclosure for achieving the above-described objective, may comprise: identifying a congestion level in one or more measurement regions; selecting a first resource selection region from among a plurality of resource selection regions, when the congestion level is greater than or equal to a first reference value; selecting a transmission resource within the first resource selection region; and performing sidelink communication with a receiving terminal using the transmission resource, wherein a size of the first resource selection region is different from a size of a second resource selection region selected from among the plurality of resource selection regions when the congestion level is less than the first reference value.

The operation method may further comprise receiving, from a base station, mapping relationship information between congestion levels and the plurality of resource selection regions, wherein each of the first resource selection region and the second resource selection region is selected based on the mapping relationship information.

The congestion level may be determined based on a ratio between the one or more measurement regions and at least one measurement region determined to be congested among the one or more measurement regions.

A degree of congestion when the congestion level is equal to or greater than the first reference value may be higher than a degree of congestion when the congestion level is less than the first reference value, and the size of the first resource selection region may be greater than the size of the second resource selection region.

The first resource selection region may include a first part that does not overlap with the second resource selection region and a second part that overlaps with the second resource selection region, and a probability of selecting the transmission resource from the first part may be configured to be higher than a probability of selecting the transmission resource from the second part.

The operation method may further comprise receiving, from a base station, configuration information of the one or more measurement regions and configuration information of the plurality of resource selection regions.

The plurality of resource selection regions for the first transmitting terminal may be configured independently of a plurality of resource selection regions for a second transmitting terminal.

An operation method of a transmitting terminal, according to a second exemplary embodiment of the present disclosure for achieving the above-described objective, may comprise: performing a first sidelink communication procedure with a receiving terminal by using a resource selection region #n among a plurality of resource selection regions; changing a resource selection region from the resource selection region #n to a resource selection region #k based on one or more hybrid automatic repeat request (HARQ) responses received in the first sidelink communication procedure; and performing a second sidelink communication procedure with the receiving terminal using the resource selection region #k among the plurality of resource selection regions, wherein a size of the resource selection region #n is different from a size of the resource selection region #k, and each of n and k is a natural number.

When the one or more HARQ responses are p consecutive acknowledgments (ACKs), a resource selection region used for the second sidelink communication procedure may be determined as the resource selection region #k smaller than the resource selection region #n, wherein p is a natural number.

When the one or more HARQ responses are j consecutive negative ACKs (NACKs), a resource selection region used for the second sidelink communication procedure may be determined as the resource selection region #k greater than the resource selection region #n, wherein j is a natural number.

The operation method may further comprise receiving, from a base station, mapping relationship information between the one or more HARQ responses and the plurality of resource selection regions, wherein the resource selection region #k is determined based on the mapping relationship information.

The second sidelink communication procedure may be performed using a transmission resource selected within the resource selection region #k, the resource selection region #k may include a first part that does not overlap with the resource selection region #n and a second part that overlaps the resource selection region #n, and a probability of selecting the transmission resource from the first part may be configured to be higher than a probability of selecting the transmission resource from the second part.

An operation method of a transmitting terminal, according to a third exemplary embodiment of the present disclosure for achieving the above-described objective, may comprise: selecting a first resource selection region mapped to a first cast type from among a plurality of resource selection regions; selecting a transmission resource within the first resource selection region; and performing sidelink communication with a receiving terminal based on the first cast type using the transmission resource, wherein a size of the first resource selection region is different from a size of a second resource selection region mapped to a second cast type among the plurality of resource selection regions.

The operation method may further comprise receiving, from a base station, mapping relationship information between a plurality of cast types including the first cast type and the second cast type and the plurality of resource selection regions, wherein the first resource selection region is determined based on the mapping relationship information.

The first cast type may be broadcast, groupcast, or unicast, and the second cast type may be different from the first cast type.

A resource selection region for broadcast may be a largest resource selection region among the plurality of resource selection regions, and a resource selection region for unicast may be a smallest resource selection region among the plurality of resource selection regions.

The operation method may further comprise receiving, from a base station, configuration information of the plurality of resource selection regions, wherein the configuration information may include at least one of an identifier of each of the plurality of resource selection regions, information of a resource pool in which the plurality of resource selection regions are configured, time resource information of the plurality of resource selection regions, frequency resource information of the plurality of resource selection regions, or combinations thereof.

An operation method of a transmitting terminal, according to a fourth exemplary embodiment of the present disclosure for achieving the above-described objective, may comprise: selecting a first resource selection region mapped to a first priority of first data from among a plurality of resource selection regions; selecting a transmission resource within the first resource selection region; and transmitting the first data to a receiving terminal using the transmission resource, wherein a size of the first resource selection region is different from a size of a second resource selection region mapped to a second priority of second data among the plurality of resource selection regions.

The operation method may further comprise receiving, from a base station, mapping relationship information between a plurality of priorities including the first priority and the second priority and the plurality of resource selection regions, wherein the first resource selection region is determined based on the mapping relationship information.

When the first priority is higher than the second priority, the size of the first resource selection region mapped to the first priority may be greater than the size of the second resource selection region mapped to the second priority.

Advantageous Effects

According to the present disclosure, a resource selection region may be selected based on a congestion state, a retransmission state, a cast type, or a data priority. For example, as a congestion level increases, a resource selection region having a larger size may be selected, and according to this operation, a probability of resource selection collision between transmitting terminals can be reduced. As a congestion level is lower, a resource selection region having a smaller size may be selected, and according to this operation, the efficiency of resource use can be improved.

DESCRIPTION OF DRAWINGS

FIG. 1 is a conceptual diagram illustrating V2X communication scenarios.

FIG. 2 is a conceptual diagram illustrating an exemplary embodiment of a cellular communication system.

FIG. 3 is a conceptual diagram illustrating an exemplary embodiment of a communication node constituting a cellular communication system.

FIG. 4 is a block diagram illustrating an exemplary embodiment of a user plane protocol stack of a UE performing sidelink communication.

FIG. 5 is a block diagram illustrating a first exemplary embodiment of a control plane protocol stack of a UE performing sidelink communication.

FIG. 6 is a block diagram illustrating a second exemplary embodiment of a control plane protocol stack of a UE performing sidelink communication.

FIG. 7 is a sequence chart illustrating a first exemplary embodiment of a method for determining a resource selection region based on a congestion state.

FIG. 8 is a conceptual diagram illustrating a first exemplary embodiment of measurement region(s).

FIG. 9 is a conceptual diagram illustrating a first exemplary embodiment of resource selection regions.

FIG. 10 is a conceptual diagram illustrating a second exemplary embodiment of resource selection regions.

FIG. 11 is a conceptual diagram illustrating a third exemplary embodiment of resource selection regions.

FIG. 12 is a conceptual diagram illustrating a fourth exemplary embodiment of resource selection regions.

FIG. 13 is a sequence chart illustrating a first exemplary embodiment of a method of determining a resource selection region based on a retransmission state.

FIG. 14 is a sequence chart illustrating a first exemplary embodiment of a method of determining a resource selection region based on a cast type.

FIG. 15 is a sequence chart illustrating a first exemplary embodiment of a method of determining a resource selection region based on a priority.

MODE FOR INVENTION

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

FIG. 3 is a conceptual diagram illustrating an exemplary embodiment of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or anon-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, sidelink communication methods will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell-specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single-SCI scheme or a multi-SCI scheme. When the single-SCI scheme is used, data transmission (e.g., sidelink data transmission, sidelink-shared channel (SL-SCH) transmission) may be performed based on one SCI (e.g., 1st-stage SCI). When the multi-SCI scheme is used, data transmission may be performed using two SCIS (e.g., 1st-stage SCI and 2nd-stage SCI). The SCI(s) may be transmitted on a PSCCH and/or a PSSCH. When the single-SCI scheme is used, the SCI (e.g., 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'. A format of the first-stage SCI may include a SCI format 1-A, and a format of the second-stage SCI may include a SCI format 2-A and a SCI format 2-B.

The 1st-stage SCI may include or more information elements among priority information, frequency resource assignment information, time resource assignment information, resource reservation period information, demodulation reference signal (DMRS) pattern information, 2nd-stage SCI format information, a beta offset indicator, the number of DMRS ports, and modulation and coding scheme (MCS) information. The 2nd-stage SCI may include one or more information elements among a HARQ processor identifier (ID), a redundancy version (RV), a source ID, a destination ID, CSI request information, a zone ID, and communication range requirements.

A transmitting terminal may select a sidelink (SL) resource by performing a sensing operation (e.g., partial sensing operation) or a random selection operation, and may transmit SL data using the selected SL resource. In exemplary embodiments, a transmitting terminal may be a terminal transmitting SL data, and a receiving terminal may be a terminal receiving the SL data. In addition, in exemplary embodiments, a resource selection operation may mean a sensing operation and/or a random selection operation.

The resource selection operation may be performed within a resource selection region (e.g., resource selection pool). For reduction of a probability that a plurality of transmitting terminals select the same SL resource (e.g., resource collision probability) and/or for improvement of an SL resource use efficiency, the size and/or location (e.g., location in the time domain and/or frequency domain) of the resource selection region may vary based on at least one of a congestion state, a retransmission state, a data priority, or a cast type (e.g., broadcast, multicast, groupcast, unicast).

—Method 1: Method of Determining a Resource Selection Region Based on a Congestion State FIG. 7 is a sequence chart illustrating a first exemplary embodiment of a method for determining a resource selection region based on a congestion state.

As shown in FIG. 7, a communication system may include a base station, a transmitting terminal, and a receiving terminal. The base station may be the base station 210 or the relay 220 shown in FIG. 2, the transmitting terminal may be the UE 235 shown in FIG. 2, and the receiving terminal may be the UE 236 shown in FIG. 2. Each of the base station, the transmitting terminal, and the receiving terminal may be configured identically or similarly to the communication node 300 shown in FIG. 3. Each of the transmitting terminal and the receiving terminal may support the protocol stacks shown in FIGS. 4 to 6.

The base station may configure measurement region(s) within an SL resource region (e.g., resource pool), and may transmit configuration information of the measurement region(s) to the transmitting terminal and/or the receiving terminal (S701). The configuration information of the measurement region(s) may be transmitted using at least one of system information, radio resource control (RRC) message, medium access control (MAC) control element (CE), or control information (e.g., downlink control information (DCI)). Alternatively, the measurement region(s) may be defined in technical specifications. In this case, since the transmitting terminal and the receiving terminal know the measurement region(s), step S701 may be omitted. The measurement region(s) may refer to resource region(s) in which a measurement operation of a congestion state (e.g., congestion degree, congestion level, or the like) is performed. The measurement region(s) may be configured as follows.

FIG. 8 is a conceptual diagram illustrating a first exemplary embodiment of measurement region(s).

As shown in FIG. 8, the base station may configure 9 measurement regions (e.g., measurement regions #1 to #9) within the SL resource region. One SL resource region (e.g., the entire SL resource region) may be divided into 9 measurement regions. The measurement operation of the congestion stage may be performed in one or more measurement regions. For example, a communication node (e.g., base station, transmitting terminal, and/or receiving terminal) may perform a monitoring operation for receiving a signal (e.g., reference signal and/or synchronization signal) in one or more measurement regions, measure a quality of the received signal, and estimate the congestion state based on the measured quality. In the frequency domain, one measurement region may be configured in units of subcarriers, resource blocks (RBs), or sub-channels. In the time domain, one measurement region may be configured in units of symbols, mini-slots, slots, or subframes.

Referring again to FIG. 7, the configuration information of the measurement region(s) may include one or more information elements defined in Table 3 below.

TABLE 3

|  | Information elements |
|---|---|
| Time resource information | The length of measurement region (e.g., the number of symbols, mini-slots, slots, or subframes included in the measurement region in the time domain) |
|  | The number of measurement regions configured in the time domain (e.g., 3 in the exemplary embodiment of FIG. 8) |
|  | Start time of the first measurement region in the time domain (e.g., symbol index or slot index) |
|  | End time of the last measurement region in the time domain (e.g., symbol index or slot index) |

TABLE 3-continued

| | Information elements |
|---|---|
| Frequency resource information | The size of measurement region (e.g., the number of subcarriers, RBs, or sub-channels included in the measurement region in the frequency domain)<br>The number of measurement regions configured in the frequency domain (e.g., 3 in the exemplary embodiment of FIG. 8)<br>Start point of the first measurement region in the frequency domain (e.g., subcarrier index or RB index)<br>End point of the last measurement region in the frequency domain (e.g., subcarrier index or RB index) |
| Resource pool information | Resource pool index (e.g., index of a resource pool in which measurement region(s) are configured)<br>The number of measurement regions configured in a resource pool |
| Measurement threshold | Reference signal received power (RSRP) threshold or range<br>Reference signal received quality (RSRQ) threshold or range<br>Received signal strength indicator (RSSI) threshold or range<br>Channel busy ratio (CBR) threshold or range<br>Signal to interference plus noise ratio (SINR) threshold or range |

The transmitting terminal may identify the measurement region(s) based on the configuration information received from the base station. Alternatively, the transmitting terminal may identify the measurement region(s) defined in technical specifications. The transmitting terminal may identify a congestion state (e.g., congestion degree, congestion level) of the measurement region(s) (S702). For example, the transmitting terminal may identify the congestion state of the measurement region(s) by performing a congestion measurement operation. The transmitting terminal may measure an RSRP, RSRQ, RSSI, CBR, and/or SINR for signal(s) (e.g., reference signals and/or synchronization signals) in each of the measurement region(s). The transmitting terminal may determine (or identify) that the corresponding measurement region is congested when a measurement result is equal to or greater than a measurement threshold defined in Table 3 or when a measurement result is less than a measurement threshold defined in Table 3. In addition, the transmitting terminal may determine (or identify) a congestion state for the SL resource region (e.g., the entire SL resource region). For example, the SL resource region may include 9 measurement regions, and 3 measurement regions among the 9 measurement regions may be determined to be in a congested state. In this case, the transmitting terminal may determine a degree of congestion (or congestion level) of the SL resource region as 33%.

Alternatively, the congestion state for the measurement region(s) may be measured by another communication node (e.g., base station or another terminal) instead of the transmitting terminal. In this case, another communication node may transmit information on the measured congestion state to the transmitting terminal, and the transmitting terminal may identify the congestion state for the measurement region(s) based on the information received from the another communication node. Another terminal performing the congestion measurement operation may be a group leader of a group to which the transmitting terminal belongs.

The transmitting terminal may determine a resource selection region based on the congestion state (e.g., congestion degree or congestion level) (S703). The resource selection region may be a resource region in which a resource selection operation (e.g., sensing operation and/or random selection operation) of the transmitting terminal is performed. The resource selection region may be configured independently of the measurement region(s) shown in FIG. 8. Alternatively, the resource selection region may be configured identically to the measurement region(s) shown in FIG. 8. The resource selection region may be configured to include one or more measurement regions shown in FIG. 8. A plurality of resource selection regions may be configured. The plurality of resource selection regions may be resource regions orthogonal to each other. Alternatively, the plurality of resource selection regions may partially overlap or fully overlap. The resource selection regions may be configured as follows.

FIG. 9 is a conceptual diagram illustrating a first exemplary embodiment of resource selection regions.

As shown in FIG. 9, resource selection regions #1 to #3 may be configured within the SL resource region. The resource selection region #1 may be the same as the SL resource region. The SL resource region may mean a resource pool. The resource selection region #3 may belong to the resource selection regions #1 and #2. The resource selection region #2 may belong to the resource selection region #1. In the frequency domain, the resource selection regions #1 to #3 may have the same size and location. In the time domain, start times of the resource selection regions #1 to #3 may be the same, the lengths of the resource selection regions #1 to #3 may be different from each other, and end times of the resource selection regions #1 to #3 may be different from each other. In the frequency domain, each of the resource selection regions #1 to #3 may be configured in units of subcarriers, RBs, or subchannels, and in the time domain, each of the resource selection regions #1 to #3 may be configured in units of symbols, mini-slots, slots, or subframes.

FIG. 10 is a conceptual diagram illustrating a second exemplary embodiment of resource selection regions.

As shown in FIG. 9, resource selection regions #1 to #3 may be configured within the SL resource region. The resource selection region #1 may be the same as the SL resource region. The SL resource region may mean a resource pool. The resource selection region #1 may include the resource selection regions #2 and #3. The resource selection region #2 may be configured to be orthogonal to the resource selection region #3. In the frequency domain, the resource selection regions #1 to #3 may have the same size and location. In the frequency domain, start times of the resource selection regions #1 and #3 may be the same, and an end time of the resource selection region #3 be the same as the start time of the resource selection region #2. In the time domain, the end times of the resource selection regions #2 and #3 may be the same, and the lengths of the resource selection regions #1 to #3 may be different from each other. In the frequency domain, each of the resource selection regions #1 to #3 may be configured in units of subcarriers, RBs, or subchannels, and in the time domain, each of the resource selection regions #1 to #3 may be configured in units of symbols, mini-slots, slots, or subframes.

in FIG. 8. In this case, Table 3 may be interpreted as configuration information of the resource selection region(s).

Meanwhile, resource selection regions (e.g., the resource selection regions shown in FIGS. 9 to 12) may be configured by the base station. The base station may transmit configuration information of the resource selection regions using at least one of system information, RRC message, MAC CE, or control information. The configuration information of each of the resource selection regions may include one or more information elements defined in Table 4 below.

TABLE 4

| | Information elements |
|---|---|
| Identifier of resource selection region | Index for identifying each resource selection region |
| Resource pool information | Resource pool index (e.g., index of a resource pool in which the resource selection region(s) are configured) |
| Time resource information | The length of resource selection region (e.g., the number of symbols, mini-slots, slots, or subframes included in the resource selection region in the time domain) Start time of resource selection region in the time domain (e.g., symbol index or slot index) End time of resource selection region in the time domain (e.g., symbol index or slot index) |
| Frequency resource information | The size of resource selection region (e.g., the number of subcarriers, RBs, or sub-channels included in the resource selection region in the frequency domain) Start point of resource selection region in the frequency domain (e.g., subcarrier index or RB index) End point of resource selection region in the frequency domain (e.g., subcarrier index or RB index) |

FIG. 11 is a conceptual diagram illustrating a third exemplary embodiment of resource selection regions.

As shown in FIG. 11, resource selection regions for a plurality of transmitting terminals may be configured within the SL resource region. Resource selection regions #11, #12, and #13 may be configured for a transmitting terminal #1, and resource selection regions #21, #22, and #23 may be configured for a transmitting terminal #2. The resource selection regions for the transmitting terminal #1 may be configured independently of the resource selection regions for the transmitting terminal #2. For example, the resource selection regions for the transmitting terminal #1 may be orthogonal to the resource selection regions for the transmitting terminal #2.

FIG. 12 is a conceptual diagram illustrating a fourth exemplary embodiment of resource selection regions.

As shown in FIG. 12, resource selection regions for a plurality of transmitting terminals may be configured within the SL resource region. For example, resource selection region(s) for a transmitting terminal #1 and resource selection region(s) for a transmitting terminal #2 may be configured. A resource selection region for the transmitting terminal #1 may overlap with a resource selection region for the transmitting terminal #2. A plurality of resource selection regions (e.g., resource selection regions #11 to #13 shown in FIG. 11) may be configured for the transmitting terminal #1, and a plurality of resource selection regions (e.g., resource selection regions #21 to #23 shown in FIG. 11) may be configured for the transmitting terminal #2.

As another method different from the exemplary embodiments shown in FIGS. 9 to 12, each of the measurement regions shown in FIG. 8 may be interpreted as one resource selection region. That is, the resource selection region may be configured identically to the measurement region shown For example, the configuration information of the resource selection region #1 may include an identifier of the resource selection region, resource pool information, time resource information, and/or frequency resource information. Here, the identifier may be an index indicating the resource selection region #1, and the resource pool information, time resource information, and/or frequency resource information may be information for the resource selection region #1.

The configuration information of the resource selection region(s) may be transmitted together with the configuration information of the measurement region(s) in step S701 shown in FIG. 7. In this case, the transmitting terminal and/or the receiving terminal may identify the resource selection region(s) as well as the measurement region(s) based on the configuration information received from the base station. Alternatively, the configuration information of the resource selection region(s) may be transmitted before or after step S701 shown in FIG. 7.

The configuration information of the resource selection region(s) may be transmitted in step S1301 shown in FIG. 13, step S1401 shown in FIG. 14, and/or step S1501 shown in FIG. 15. Alternatively, the resource selection region(s) may be predefined in technical specifications. In this case, a signaling operation of the configuration information of the resource selection region(s) may be omitted.

When the resource selection regions are configured as shown in FIG. 9, the sizes of the resource selection regions in the frequency domain may be the same, and start times of the resource selection regions in the time domain may be the same. In this case, information on the size of the resource selection regions in the frequency domain and information on the start time of the resource selection regions in the time domain may be transmitted as common configuration information of the resource selection regions. The remaining information (e.g., information different for each resource selection region) may be transmitted as individual information of the resource selection regions. In the exemplary embodiments shown in FIG. 9, the resource selection regions have different end times in the time domain, and the different end times may be used to distinguish the resource selection regions. In this case, the base station may transmit end time information instead of an identifier (e.g., index) to indicate a specific resource selection region. The transmitting terminal may identify a resource selection region indicated by the base station based on end time information received from the base station.

Referring again to FIG. 7, in step S703, the transmitting terminal may determine a resource selection region based on Table 5 below.

TABLE 5

| Congestion state | Resource selection region |
|---|---|
| Congestion level 1 | Resource selection region #1 |
| Congestion level 2 | Resource selection region #2 |
| Congestion level 3 | Resource selection region #3 |

If the congestion state determined in step S702 is a congestion level 1, the transmitting terminal may select the resource selection region #1 (e.g., resource selection region #1 shown in FIGS. 9 and 10, resource selection region #11 shown in FIG. 11). If the congestion state determined in step S702 is a congestion level 2, the transmitting terminal may select the resource selection region #2 (e.g., resource selection region #2 shown in FIGS. 9 and 10, resource selection region #12 shown in FIG. 11). If the congestion state determined in step S702 is a congestion level 3, the transmitting terminal may select the resource selection region #3 (e.g., resource selection region #3 shown in FIGS. 9 and 10, resource selection region #13 shown in FIG. 11).

A mapping relationship between congestion levels and resource selection regions (e.g., mapping relationship defined in Table 5) may be configured in advance. For example, the base station may transmit mapping relationship information between congestion levels and resource selection regions using at least one of system information, RRC message, MAC CE, or control information. The transmitting terminal and/or the receiving terminal may identify the mapping relationship between congestion levels and resource selection regions based on the information received from the base station. The mapping relationship information between congestion levels and resource selection regions may be transmitted in step S701. Alternatively, the mapping relationship information between congestion levels and resource selection regions may be transmitted before or after step S701. Alternatively, the mapping relationship information between congestion levels and resource selection regions may be predefined in technical specifications.

A plurality of congestion levels may be configured based on specific threshold(s). The degree of congestion (e.g., congestion level) may decrease in the order of (congestion level 1→congestion level 2→congestion level 3). For example, the congestion level 1 may mean the most congested state. In the exemplary embodiment shown in FIG. 8, when it is determined that 6 or more measurement regions among 9 measurement regions are congested (e.g., when the degree of congestion is 66% or more), the transmitting terminal may determine that the congestion state is the congestion level 1. When it is determined that less than 3 measurement regions among the 9 measurement regions are congested (e.g., when the degree of congestion is less than 33%), the transmitting terminal may determine that the congestion state is the congestion level 3. In case when '33% degree of congestion <66%', the transmitting terminal may determine that the congestion state is the congestion level 2. The value(s) used to distinguish congestion levels (e.g., 'congestion level=33%', 'congestion level=66%', and/or the like) may be referred to as reference value(s).

The size of the resource selection region may decrease in the order of (resource selection region #1→resource selection region #2→resource selection region #3). For example, among the resource selection regions, the resource selection region #1 may have the largest size. As the degree of congestion increases, a resource selection region having a large size may be allocated, and according to this operation, a probability of resource selection collision between transmitting terminals may be reduced. As the degree of congestion is lower, a resource selection region having a smaller size may be allocated, and according to this operation, the efficiency of resource use may be improved.

Alternatively, measurement region(s) with a low degree of congestion among the measurement regions shown in FIG. 8 may be configure as the resource selection region #1, measurement region(s) with a high degree of congestion among the measurement regions shown in FIG. 8 may be configured as the resource selection region #3, and the remaining measurement region(s) not configured as the resource selection regions #1 and #3 among the measurement regions shown in FIG. 8 may be configured as the resource selection region #2. In this case, based on Table 5, in the case of the congestion level 1, the resource selection region #1 (e.g., measurement region(s) having a low degree of congestion) may be used, and in the case of the congestion level 3, the resource selection region #3 (e.g., measurement region(s) with a high degree of congestion) may be used.

Meanwhile, the transmitting terminal may select a transmission resource by performing a resource selection operation within the resource selection region determined in step S703 (S704). The transmitting terminal may perform sidelink transmission (e.g., SCI and/or data transmission) using the transmission resource (S705). The receiving terminal may receive SCI and/or data from the transmitting terminal by performing a monitoring operation within resource selection region(s).

—Method 2: Method for Determining a Resource Selection Region Based on a Retransmission State FIG. 13 is a sequence chart illustrating a first exemplary embodiment of a method of determining a resource selection region based on a retransmission state.

As shown in FIG. 13, a communication system may include a base station, a transmitting terminal, and a receiving terminal. The base station may be the base station 210 or the relay 220 shown in FIG. 2, the transmitting terminal may be the UE 235 shown in FIG. 2, and the receiving terminal may be the UE 236 shown in FIG. 2. Each of the base station, the transmitting terminal, and the receiving terminal may be configured identically or similarly to the communication node 300 shown in FIG. 3. Each of the transmitting terminal and the receiving terminal may support the protocol stacks shown in FIGS. 4 to 6.

The base station may configure resource selection region (s). The resource selection region(s) may be the resource selection region(s) shown in FIGS. 9 to 12. The base station may transmit configuration information of the resource selection region(s) using at least one of system information, RRC message, MAC CE, or control information (S1301).

The transmitting terminal and/or the receiving terminal may receive the configuration information from the base station, and identify the resource selection region(s) based on the configuration information. The configuration information of the resource selection region(s) may include one or more information elements defined in Table 4.

The transmitting terminal may select a transmission resource by performing a resource selection operation in the resource selection region #n, and may perform sidelink communication with the receiving terminal using the transmission resource (S1302). n may be a natural number, and the resource selection region #n may be one of the resource selection regions #1 to #3 shown in FIG. 9 or FIG. 10. In step S1302, the sidelink communication may be performed based on a broadcast scheme, a multicast scheme, a groupcast scheme, or a unicast scheme. In step S1302, the receiving terminal may transmit a hybrid automatic repeat request (HARQ) response (e.g., acknowledgment (ACK) or negative ACK (NACK)) for data to the transmitting terminal.

The transmitting terminal may determine (e.g., change) the resource selection region based on the HARQ response(s) received from the receiving terminal (S1303). The size of the resource selection region may be adjusted based on the HARQ response(s). In step S1303, the transmitting terminal may determine a resource selection region based on Table 6 below. When the NACK-only scheme is used, 'no NACK' may be interpreted as ACK. That is, in Table 6 below, ACK may mean 'no NACK'.

TABLE 6

| HARQ responses | Resource selection region #n in step S1302 | Resource selection region #k in step S1304 |
| --- | --- | --- |
| p consecutive ACKs | Resource selection region #1 | Resource selection region #2 |
|  | Resource selection region #2 | Resource selection region #3 |
|  | Resource selection region #3 | Resource selection region #3 |
| k consecutive NACKS | Resource selection region #3 | Resource selection region #2 |
|  | Resource selection region #2 | Resource selection region #1 |
|  | Resource selection region #1 | Resource selection region #1 |

In Table 6, each of p, j, n, and k may be a natural number. The size of the resource selection region may decrease in the order of (resource selection region #1→resource selection region #2→resource selection region #3). A mapping relationship between HARQ responses and resource selection regions may be configured. The base station may transmit mapping relationship information (e.g., mapping relationship information defined in Table 6) between HARQ responses and resource selection regions using at least one of system information, RRC message, MAC CE, or control information. The mapping relationship information may include a value of p and a value of j set by the base station. p may be configured to be equal to j. Alternatively, p may be configured to be different from j.

The transmitting terminal and/or the receiving terminal may identify the mapping relationship between HARQ responses and resource selection regions based on the information received from the base station. The mapping relation information between HARQ responses and resource selection regions may be transmitted in step S1301. Alternatively, the mapping relationship information between HARQ responses and resource selection regions may be transmitted before or after step S1301. Alternatively, the mapping relationship between HARQ responses and resource selection regions may be defined in technical specifications. In this case, a signaling operation of the mapping relationship information between HARQ responses and resource selection regions may be omitted.

When p consecutive ACKs (e.g., 2 consecutive ACKs or 2 consecutive no NACKs) are received from the receiving terminal in step S1302, the transmitting terminal may change the resource selection region to a resource selection region having a smaller size. The occurrence of consecutive ACKs or the occurrence of consecutive no NACKs may mean that a resource selection collision between transmitting terminals does not occur. In this case, a degree of congestion or occupancy of the resource selection region #n used in step S1302 may be estimated to be low. Accordingly, the transmitting terminal may improve resource efficiency by using a resource selection region having a smaller size. When the resource selection region #1 is used and p consecutive ACKs are received in step S1302, the transmitting terminal may change the resource selection region #1 to the resource selection region #2, and may perform sidelink communication using a transmission resource selected within the resource selection region #2 in step S1304. When the resource selection region #3 is used and p consecutive ACKs are received in step S1302, since no resource selection region having a size smaller than the resource selection region #3 exists, the transmitting terminal may maintain the resource selection region #3. Accordingly, the transmitting terminal may perform sidelink communication using a transmission resource selected within the resource selection region #3 in step S1304.

The occurrence of consecutive NACKs may mean that a resource selection collision between transmitting terminals occurs. In this case, a degree of congestion or occupancy of the resource selection region #n used in step S1302 may be estimated to be high. Accordingly, the transmitting terminal may reduce the number of retransmissions by using a resource selection region having a larger size. When the resource selection region #3 is used and j consecutive NACKs are received in step S1302, the transmitting terminal may the resource selection region #3 to the resource selection region #2, and may perform sidelink communication using a transmission resource selected within the resource selection region #2. When the resource selection region #1 is used and p consecutive NACKs are received in step S1302, since no resource selection region having a size larger than the resource selection region #1 exists, the transmitting terminal may maintain the resource selection region #1. Accordingly, the transmitting terminal may perform sidelink communication using a transmission resource selected within the resource selection region #1 in step S1304.

—Method 3: Method for Determining a Resource Selection Region Based on a Cast Type FIG. 14 is a sequence chart illustrating a first exemplary embodiment of a method of determining a resource selection region based on a cast type.

As shown in FIG. 14, a communication system may include a base station, a transmitting terminal, and a receiving terminal. The base station may be the base station 210 or the relay 220 shown in FIG. 2, the transmitting terminal may be the UE 235 shown in FIG. 2, and the receiving terminal may be the UE 236 shown in FIG. 2. Each of the base station, the transmitting terminal, and the receiving terminal may be configured identically or similarly to the communication node 300 shown in FIG. 3. Each of the transmitting terminal and the receiving terminal may support the protocol stacks shown in FIGS. 4 to 6.

The base station may configure resource selection region(s). The resource selection region(s) may be the resource selection region(s) shown in FIGS. 9 to 12. The base station may transmit configuration information of the resource selection region(s) using at least one of system information, RRC message, MAC CE, or control information (S1401). The transmitting terminal and/or the receiving terminal may receive the configuration information from the base station, and identify the resource selection region(s) based on the configuration information. The configuration information of the resource selection region(s) may include one or more information elements defined in Table 4.

The transmitting terminal may determine a resource selection region based on a cast type (S1402). The size of the resource selection region may vary according to the cast type. The cast type may be broadcast, groupcast, or unicast. In step S1402, the transmitting terminal may determine a resource selection region based on Table 7 below.

TABLE 7

| Cast type | Resource selection region |
|---|---|
| Broadcast | Resource selection region #1 |
| Groupcast | Resource selection region #2 |
| unicast | Resource selection region #3 |

The resource selection regions #1 to #3 in Table 7 may be the resource selection regions #1 to #3 shown in FIG. 9 or FIG. 10. The size of the resource selection region may decrease in the order of (resource selection region #1→resource selection region #2→resource selection region #3). Alternatively, a mapping relationship between cast types and resource selection regions may be configured to be opposite to the mapping relationship defined in Table 7. For example, if the unicast scheme has a high priority, the unicast scheme may be mapped to the resource selection region #1, and the broadcast scheme may be mapped to the resource selection region #3.

The mapping relationship between cast types and resource selection regions may be configured. The base station may transmit mapping relationship information (e.g., mapping relationship information defined in Table 7) between cast types and resource selection regions using at least one of system information, RRC message, MAC CE, or control information. The transmitting terminal and/or the receiving terminal may identify the mapping relationship between cast types and resource selection regions based on the information received from the base station. The mapping relationship information between cast types and resource selection regions may be transmitted in step S1401. Alternatively, the mapping relationship information between cast types and resource selection regions may be transmitted before or after step S1401. Alternatively, the mapping relationship between cast types and resource selection regions may be defined in technical specifications. In this case, a signaling operation of the mapping relationship information between cast types and resource selection regions may be omitted.

When the cast type is broadcast, the transmitting terminal may select the resource selection region #1, which is the largest resource selection region, and may select a transmission resource by performing a resource selection operation within the resource selection region #1. The transmitting terminal may perform sidelink communication (e.g., broadcast-based sidelink communication) using the transmission resource (S1403). When the resource selection region #1 is used, resource selection collisions between transmitting terminals may be minimized. When the cast type is groupcast, the transmitting terminal may select the resource selection region #2, and select a transmission resource by performing a resource selection operation within the resource selection region #2. The transmitting terminal may perform sidelink communication (e.g., groupcast-based sidelink communication) using the transmission resource (S1403).

When the cast type is unicast, the transmitting terminal may select the resource selection region #3, which is the smallest resource selection region, and may select a transmission resource by performing a resource selection operation within the resource selection region #3. The transmitting terminal may perform sidelink communication (e.g., unicast-based sidelink communication) using the transmission resource (S1403). When the resource selection region #3 is used, resource efficiency can be improved, but resource selection collisions between transmitting terminals may increase.

—Method 4: Method for Determining a Resource Selection Region Based on a Data Priority (Cast Priority)

FIG. 15 is a sequence chart illustrating a first exemplary embodiment of a method of determining a resource selection region based on a priority.

As shown in FIG. 15, a communication system may include a base station, a transmitting terminal, and a receiving terminal. The base station may be the base station 210 or the relay 220 shown in FIG. 2, the transmitting terminal may be the UE 235 shown in FIG. 2, and the receiving terminal may be the UE 236 shown in FIG. 2. Each of the base station, the transmitting terminal, and the receiving terminal may be configured identically or similarly to the communication node 300 shown in FIG. 3. Each of the transmitting terminal and the receiving terminal may support the protocol stacks shown in FIGS. 4 to 6.

The base station may configure resource selection region(s). The resource selection region(s) may be the resource selection region(s) shown in FIGS. 9 to 12. The base station may transmit configuration information of the resource selection region(s) using at least one of system information, RRC message, MAC CE, or control information (S1501). The transmitting terminal and/or the receiving terminal may receive the configuration information from the base station, and identify the resource selection region(s) based on the configuration information. The configuration information of the resource selection region(s) may include one or more information elements defined in Table 4.

The transmitting terminal may determine a resource selection region based on a data priority (S1502). The size of the resource selection region may vary according to the data priority. The data priority may mean a service priority. Here, a service may mean an enhanced mobile broadband (eMBB) service, an ultra-reliable and low latency communication (URLC) service, and/or a massive machine type communication (mMTC) service. In step S1502, the transmitting terminal may determine a resource selection region based on Table 8 below.

TABLE 8

| Data priority | Resource selection region |
| --- | --- |
| Priority #1 | Resource selection region #1 |
| Priority #2 | Resource selection region #2 |
| Priority #3 | Resource selection region #3 |

In Table 8, a priority #1 may be the highest priority, a priority #2 may be the next highest priority below the priority #1, and the priority #3 may be the lowest priority. The data priority may be determined based on latency requirements, quality of service (QoS) requirements, and/or other requirements. For example, a priority of URLLC data (e.g., URLLC service) may be the priority #1, a priority of mMTC data (e.g., mMTC service) may be the priority #2, and a priority of eMBB data (e.g., eMBB service) may be the priority #3.

The resource selection regions #1 to #3 in Table 8 may be the resource selection regions #1 to #3 shown in FIG. 9 or FIG. 10. The size of the resource selection region may decrease in the order of (resource selection region #1→resource selection region #2→resource selection region #3). Alternatively, a mapping relationship between priorities and resource selection regions may be configured to be opposite to the mapping relationship defined in Table 8.

The mapping relationship between priorities and resource selection regions may be configured. The base station may transmit mapping relationship information (e.g., mapping relationship information defined in Table 8) between priorities and resource selection regions using at least one of system information, an RRC message, MAC CE, or control information. The transmitting terminal and/or the receiving terminal may identify the mapping relationship between priorities and resource selection regions based on the information received from the base station. The mapping relationship information between priorities and resource selection regions may be transmitted in step S1501. Alternatively, the mapping relationship information between priorities and resource selection regions may be transmitted before or after step S1501. Alternatively, the mapping relationship between priorities and resource selection regions may be defined in technical specifications. In this case, a signaling operation of the mapping relationship information between priorities and resource selection regions may be omitted.

When the priority of data to be transmitted by the transmitting terminal is the priority #1, the transmitting terminal may select the resource selection region #1, which is the largest resource selection region, and perform a resource selection operation within the resource selection region #1 to select a transmission resource. The transmitting terminal may perform sidelink communication (e.g., transmission of the data having the priority #1) using the transmission resource (S1503). When the resource selection region #1 is used, resource selection collisions between transmitting terminals may be minimized. When the priority of data to be transmitted by the transmitting terminal is the priority #2, the transmitting terminal may select the resource selection region #2, and may select a transmission resource by performing a resource selection operation within the resource selection region #2. The transmitting terminal may perform sidelink communication (e.g., transmission of the data having the priority #2) using the transmission resource (S1503).

When the priority of data to be transmitted by the transmitting terminal is the priority #3, the transmitting terminal may select the resource selection region #3, which is the smallest resource selection region, and perform a resource selection operation within the resource selection region #3 to select a transmission resource. The transmitting terminal may perform sidelink communication (e.g., transmission of the data having the priority #3) using the transmission resource (S1503). When the resource selection region #3 is used, resource use efficiency may be improved, but resource selection collisions between transmitting terminals may increase.

In another exemplary embodiment, the transmitting terminal may determine a resource selection region based on its own speed. A speed threshold may be configured by the base station. That is, the base station may inform the transmitting terminal of the speed threshold. In addition, the base station may transmit, to the transmitting terminal, configuration information of a resource selection region (e.g., resource selection region #1 shown in FIGS. 9 and 10) used by a transmitting terminal having a speed equal to or higher than the speed threshold and configuration information of a resource selection region (e.g., resource selection region #2 shown in FIGS. 9 and 10) used by a transmitting terminal having a speed lower than the speed threshold. The size of the resource selection region used by a transmitting terminal having a speed equal to or higher than the speed threshold may be configured to be larger than the size of the resource selection region used by a transmitting terminal having a speed lower than the speed threshold. Alternatively, the size of the resource selection region used by a transmitting terminal having a speed equal to or higher than the speed threshold may be configured to be smaller than the size of the resource selection region used by a transmitting terminal having a speed lower than the speed threshold.

The transmitting terminal may compare its speed with the speed threshold. When the speed of the transmitting terminal is greater than or equal to the speed threshold, the transmitting terminal may select the resource selection region #1 from among a plurality of resource selection regions, select a transmission resource within the resource selection region #1, and use the transmission resource to perform sidelink communication. When the speed of the transmitting terminal is less than the speed threshold, the transmitting terminal may select the resource selection region #2 from among a plurality of resource selection regions, select a transmission resource within the resource selection region #2, and use the transmission resource to perform sidelink communication.

Meanwhile, in the above-described exemplary embodiments, the operation of selecting a transmission resource within the resource selection region (e.g., S704, S1304, S1403, and S1503) may be performed in consideration of a collision probability in an overlapping part between the resource selection regions. In the exemplary embodiment shown in FIG. 9, the resource selection region #3 may overlap both the resource selection regions #1 and #2. Accordingly, when a transmission resource is selected within the resource selection region #3, the probability of resource selection collision between transmitting terminals may increase. In order to solve the above problem, when the transmitting terminal selects a transmission resource within the resource selection region #2, the transmitting terminal may be configured to operate so that a probability of selecting a resource from a region of (resource selection region #2-resource selection region #3) is higher than a probability of selecting a resource from an overlapping part between the resource selection region #2 and the resource selection region #3.

When the transmitting terminal selects a transmission resource within the resource selection region #1, the transmitting terminal may be configured to operate so that a probability of selecting a resource from a region of (resource selection region #1-resource selection region #2) is higher than a probability of selecting a resource from a region of (resource selection region #2-resource selection region #3) or the resource selection region #3. To support the operations described above, a specific equation may be used. Differential resource selection probabilities may be calculated by substituting the allocated time resource information and/or the allocated frequency resource information into a specific equation.

When the resource selection region #1 is used, the resource selection probabilities may be defined as shown in Table 9 below. Based on Table 9, the transmitting terminal may select a transmission resource within the resource selection region #1.

TABLE 9

| | Resource selection probability |
|---|---|
| Resource selection region #3 | 25% (i.e., 0.25) |
| Resource selection region #2-Resource selection region #3 | 25% (i.e., 0.25) |
| Resource selection region #1-Resource selection region #2 | 50% (i.e., 0.5) |

Here, the region of (resource selection region #2-resource selection region #3) may mean a region excluding the resource selection region #3 from the resource selection region #2. In addition, the region of (resource selection region #1-resource selection region #2) may mean a region excluding the resource selection region #2 from the resource selection region #1. A resource selection probability in a part where resource selection regions do not overlap may be configured to be high, and a resource selection probability in a part where resource selection regions overlap may be configured to be low. The communication node (e.g., base station, transmitting terminal, and/or receiving terminal) may calculate a resource selection probability based on an equation and select a transmission resource within a resource selection region by considering the resource selection probability.

The base station may transmit configuration information of the resource selection probability(ies) (e.g., resource selection probabilities defined in Table 9) to the transmitting terminal and/or the receiving terminal using at least one of system information, RRC message, MAC CE, or control information. The configuration information of the resource selection probability(ies) may be parameter(s) used for calculating the resource selection probability(ies). The transmitting terminal may calculate the resource selection probability(ies) by substituting the parameter(s) received from the base station into the equation. The base station may change the resource selection probability(ies) by configuring the parameter(s).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

The invention claimed is:

1. An operation method of a first transmitting terminal in a communication system, the operation method comprising:
identifying a congestion level in one or more measurement regions;
selecting a first resource selection region from among a plurality of resource selection regions, when the congestion level is greater than or equal to a first reference value;
selecting a transmission resource within the first resource selection region; and
performing sidelink communication with a receiving terminal using the transmission resource,
wherein a size of the first resource selection region is different from a size of a second resource selection region selected from among the plurality of resource selection regions when the congestion level is less than the first reference value.

2. The operation method according to claim 1, further comprising receiving, from a base station, mapping relationship information between congestion levels and the plurality of resource selection regions, wherein each of the first resource selection region and the second resource selection region is selected based on the mapping relationship information.

3. The operation method according to claim 1, wherein the congestion level is determined based on a ratio between the one or more measurement regions and at least one measurement region determined to be congested among the one or more measurement regions.

4. The operation method according to claim 1, wherein a degree of congestion when the congestion level is equal to or greater than the first reference value is higher than a degree of congestion when the congestion level is less than the first reference value, and the size of the first resource selection region is greater than the size of the second resource selection region.

5. The operation method according to claim 1, wherein the first resource selection region includes a first part that does not overlap with the second resource selection region and a second part that overlaps with the second resource selection region, and a probability of selecting the transmission resource from the first part is configured to be higher than a probability of selecting the transmission resource from the second part.

6. The operation method according to claim 1, further comprising receiving, from a base station, configuration information of the one or more measurement regions and configuration information of the plurality of resource selection regions.

7. The operation method according to claim 1, wherein the plurality of resource selection regions for the first transmitting terminal are configured independently of a plurality of resource selection regions for a second transmitting terminal.

8. An operation method of a transmitting terminal in a communication system, the operation method comprising:
performing a first sidelink communication procedure with a receiving terminal by using a resource selection region #n among a plurality of resource selection regions;
changing a resource selection region from the resource selection region #n to a resource selection region #k based on one or more hybrid automatic repeat request (HARQ) responses received in the first sidelink communication procedure; and
performing a second sidelink communication procedure with the receiving terminal using the resource selection region #k among the plurality of resource selection regions,
wherein a size of the resource selection region #n is different from a size of the resource selection region #k, and each of n and k is a natural number.

9. The operation method according to claim 8, wherein when the one or more HARQ responses are p consecutive acknowledgments (ACKs), a resource selection region used for the second sidelink communication procedure is determined as the resource selection region #k smaller than the resource selection region #n, wherein p is a natural number.

10. The operation method according to claim 8, wherein when the one or more HARQ responses are j consecutive negative ACKs (NACKs), a resource selection region used for the second sidelink communication procedure is determined as the resource selection region #k greater than the resource selection region #n, wherein j is a natural number.

11. The operation method according to claim 8, further comprising receiving, from a base station, mapping relationship information between the one or more HARQ responses and the plurality of resource selection regions, wherein the resource selection region #k is determined based on the mapping relationship information.

12. The operation method according to claim 8, wherein the second sidelink communication procedure is performed using a transmission resource selected within the resource selection region #k, the resource selection region #k includes a first part that does not overlap with the resource selection region #n and a second part that overlaps the resource selection region #n, and a probability of selecting the transmission resource from the first part is configured to be higher than a probability of selecting the transmission resource from the second part.

13. An operation method of a transmitting terminal in a communication system, the operation method comprising:
selecting a first resource selection region mapped to a first cast type from among a plurality of resource selection regions;
selecting a transmission resource within the first resource selection region; and
performing sidelink communication with a receiving terminal based on the first cast type using the transmission resource,
wherein a size of the first resource selection region is different from a size of a second resource selection region mapped to a second cast type among the plurality of resource selection regions.

14. The operation method according to claim 13, further comprising receiving, from a base station, mapping relationship information between a plurality of cast types including the first cast type and the second cast type and the plurality of resource selection regions, wherein the first resource selection region is determined based on the mapping relationship information.

15. The operation method according to claim 13, wherein the first cast type is broadcast, groupcast, or unicast, and the second cast type is different from the first cast type.

16. The operation method according to claim 15, wherein a resource selection region for broadcast is a largest resource selection region among the plurality of resource selection regions, and a resource selection region for unicast is a smallest resource selection region among the plurality of resource selection regions.

17. The operation method according to claim 13, further comprising receiving, from a base station, configuration information of the plurality of resource selection regions, wherein the configuration information includes at least one of an identifier of each of the plurality of resource selection regions, information of a resource pool in which the plurality of resource selection regions are configured, time resource information of the plurality of resource selection regions, frequency resource information of the plurality of resource selection regions, or combinations thereof.

18. An operation method of a transmitting terminal in a communication system, the operation method comprising:
selecting a first resource selection region mapped to a first priority of first data from among a plurality of resource selection regions;
selecting a transmission resource within the first resource selection region; and
transmitting the first data to a receiving terminal using the transmission resource,
wherein a size of the first resource selection region is different from a size of a second resource selection region mapped to a second priority of second data among the plurality of resource selection regions.

19. The operation method according to claim 18, further comprising receiving, from a base station, mapping relationship information between a plurality of priorities including the first priority and the second priority and the plurality of resource selection regions, wherein the first resource selection region is determined based on the mapping relationship information.

20. The operation method according to claim 18, wherein when the first priority is higher than the second priority, the size of the first resource selection region mapped to the first priority is greater than the size of the second resource selection region mapped to the second priority.

* * * * *